(12) United States Patent
Jotwani et al.

(10) Patent No.: US 12,045,941 B1
(45) Date of Patent: Jul. 23, 2024

(54) MODELING OBJECT MODEL VERTICES AS JOINTS BASED ON TEMPORALLY VARIABLE POINT CLOUDS

(71) Applicant: Apple Inc., Cupertino, CA (US)

(72) Inventors: Payal Jotwani, Santa Clara, CA (US); Angela Blechschmidt, San Jose, CA (US)

(73) Assignee: APPLE INC., Cupertino, CA (US)

( * ) Notice: Subject to any disclaimer, the term of this patent is extended or adjusted under 35 U.S.C. 154(b) by 206 days.

(21) Appl. No.: 17/222,571

(22) Filed: Apr. 5, 2021

Related U.S. Application Data

(60) Provisional application No. 63/031,915, filed on May 29, 2020.

(51) Int. Cl.
*G06T 19/00* (2011.01)
*G06T 7/13* (2017.01)
*G06V 10/44* (2022.01)

(52) U.S. Cl.
CPC .............. *G06T 19/006* (2013.01); *G06T 7/13* (2017.01); *G06V 10/443* (2022.01); *G06T 2207/10028* (2013.01)

(58) Field of Classification Search
None
See application file for complete search history.

(56) References Cited

U.S. PATENT DOCUMENTS

| | | | | |
|---|---|---|---|---|
| 10,701,247 | B1* | 6/2020 | Hossain | G06T 19/006 |
| 2005/0197731 | A1* | 9/2005 | Ahn | G06T 13/20 700/130 |
| 2015/0187134 | A1* | 7/2015 | Baecher | G06T 17/10 345/420 |
| 2021/0248814 | A1* | 8/2021 | Tao | G06F 17/16 |

\* cited by examiner

*Primary Examiner* — Frank S Chen
(74) *Attorney, Agent, or Firm* — Fernando & Partners, LLP

(57) ABSTRACT

In one implementation, a method of generating an object model is performed at a device including one or more processors and non-transitory memory. The method includes obtaining a point cloud including a plurality of points, wherein each of the plurality of points is associated with a plurality of sets of coordinates in a three-dimensional space at a respective plurality of time periods. The method includes generating an object model including a plurality of vertices corresponding to the plurality of points and a plurality of edges between respective pairs of the plurality of vertices. The method includes generating, based on the sets of coordinates of a particular point, a characterization vector of a particular vertex corresponding to the particular point, wherein the characterization vector includes a joint label and joint data with respect to one or more of the plurality of edges of the particular vertex.

20 Claims, 13 Drawing Sheets

| | | | |
|---|---|---|---|
| 1 | [(X1a, Y1a, Z1a) (X1b, Y1b, Z1b)] | A | chair |
| 2 | [(X2a, Y2a, Z2a) (X2b, Y2b, Z2b)] | A | chair |
| 3 | [(X3a, Y3a, Z3a) (X3b, Y3b, Z3b)] | A | chair |
| 4 | [(X4a, Y4a, Z4a) (X4b, Y4b, Z4b)] | B | floor |
| 5 | [(X5a, Y5a, Z5a) (X5b, Y5b, Z5b)] | B | floor |
| 6 | [(X6a, Y6a, Z6a) (X6b, Y6b, Z6b)] | A | chair |
| 7 | [(X7a, Y7a, Z7a) (X7b, Y7b, Z7b)] | C | ball |
| 8 | [(X8a, Y8a, Z8a) (X8b, Y8b, Z8b)] | C | ball |
| 9 | [(X9a, Y9a, Z9a) (X9b, Y9b, Z9b)] | B | floor |

Figure 8

| 910 | 920 | 930 | 940 |
|---|---|---|---|
| 1 | (X1, Y1, Z1) | [2,4] | JDV(1) |
| 2 | (X2, Y2, Z2) | [1,4] | JDV(2) |
| 3 | (X3, Y3, Z3) | [4,6,7] | JDV(3) |
| 4 | (X4, Y4, Z4) | [1,2,3] | JDV(4) |
| 5 | (X5, Y5, Z5) | [8,9] | JDV(5) |
| 6 | (X6, Y6, Z6) | [3,7,9] | JDV(6) |
| 7 | (X7, Y7, Z7) | [3,6,9] | JDV(7) |
| 8 | (X8, Y8, Z8) | [5,9] | JDV(8) |
| 9 | (X9, Y9, Z9) | [5,6,7,8] | JDV(9) |

MODELING OBJECT MODEL VERTICES AS JOINTS BASED ON TEMPORALLY VARIABLE POINT CLOUDS

CROSS-REFERENCES TO RELATED APPLICATIONS

This application claims priority to U.S. Provisional Patent App. No. 63/031,915, filed on May 29, 2020, which is hereby incorporated by reference in its entirety.

TECHNICAL FIELD

The present disclosure generally relates to generating object model data and, in particular, to systems, methods, and devices for modeling object model vertices as joints based on temporally variable point clouds.

BACKGROUND

A point cloud includes a set of points in a three-dimensional space. In various implementations, each point in the point cloud corresponds to a surface of an object in a physical environment. Point clouds can be used to represent a physical environment in various computer vision and/or extended reality (XR) applications.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 8 illustrates a temporally variable point cloud data object in accordance with some implementations.

FIG. 9B illustrates an object model data object in accordance with various implementations.

Figure 1:
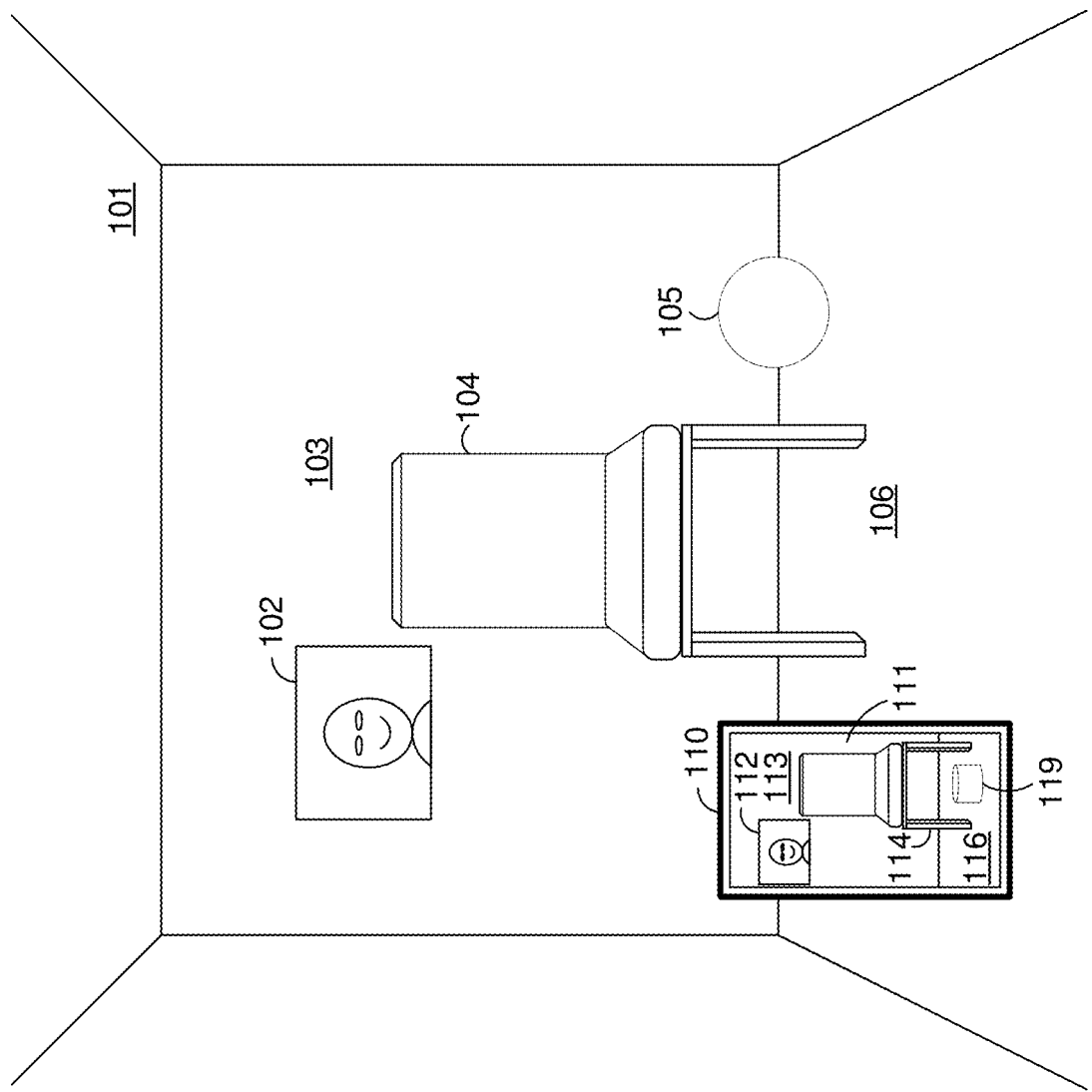
FIG. 1 illustrates a physical environment during a first time period with a handheld electronic device surveying the physical environment.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for generating an object model. In various implementations, a method is performed at a device including one or more processors and non-transitory memory. The method includes obtaining a point cloud including a plurality of points, wherein each of the plurality of points is associated with a plurality of sets of coordinates in a three-dimensional space at a respective plurality of times. The method includes generating an object model including a plurality of vertices corresponding to the plurality of points and a plurality of edges between respective pairs of the plurality of vertices. The method includes generating, based on a particular plurality of sets of coordinates of a particular point of the plurality of points, a characterization vector of a particular vertex corresponding to the particular point, wherein the characterization vector includes a joint label and joint data with respect to one or more of the plurality of edges.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

A physical environment refers to a physical place that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As an example, the XR system may detect movement of the electronic device presenting the XR environment (e.g., a mobile phone, a tablet, a laptop, a head-mounted device, and/or the like) and, in response, adjust graphical content and an acoustic field presented by the electronic device to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light sources, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In various implementations, a physical environment is represented by a point cloud. The point cloud includes a plurality of points, each of the plurality of points associated with at least a set of coordinates in the three-dimensional space and corresponding to a surface of an object in the physical environment. In various implementations, each of the plurality of points is further associated with other data representative of the surface of the object in the physical environment, such as RGB data representative of the color of the surface of the object. In various implementations, at least one of the plurality of points is further associated with a semantic label that represents an object type or identity of the surface of the object. For example, the semantic label may be "tabletop" or "table" or "wall".

In various implementations, the plurality of points is used to generate an object model of the object including a plurality of vertices (corresponding to the plurality of points) and a plurality of edges between respective pairs of the plurality of vertices. It may be advantageous to provide data as to how the plurality of vertices react to external forces (e.g., how a representation of the object is to be deformed by virtual forces, such as those applied by virtual objects). In various implementations, such data is determined based on how the plurality of points are moved in response to real forces. In various implementations, such data includes a joint label for each vertex describing a joint type and joint data with respect to one or more edges of the vertex.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

FIG. 1 illustrates a physical environment 101 during a first time period with a handheld electronic device 110 surveying the physical environment 101. The physical environment 101 includes a picture 102 hanging on a wall 103, a chair 104 on the floor 106, and a ball 105 on the floor 106.

The handheld electronic device 110 displays, on a display, a representation of the physical environment 111 including a representation of the picture 112 hanging on a representation of the wall 113 and a representation of the chair 114 on a representation of the floor 116. In various implementations, the representation of the physical environment 111 is generated based on an image of the physical environment captured with a scene camera of the handheld electronic device 110 having a field-of-view directed toward the physical environment 101. In FIG. 1, the ball 105 is not within the field-of-view of the scene camera and is, therefore, not represented in the representation of the physical environment 111.

In addition to the representations of real objects of the physical environment 101, the representation of the physical environment 111 includes a virtual object 119 displayed beneath the representation of the chair 114.

In various implementations, the handheld electronic device 110 includes a single scene camera (or single rear-facing camera disposed on an opposite side of the handheld electronic device 110 as the display). In various implementations, the handheld electronic device 110 includes at least two scene cameras (or at least two rear-facing cameras disposed on an opposite side of the handheld electronic device 110 as the display).

Figure 2B:
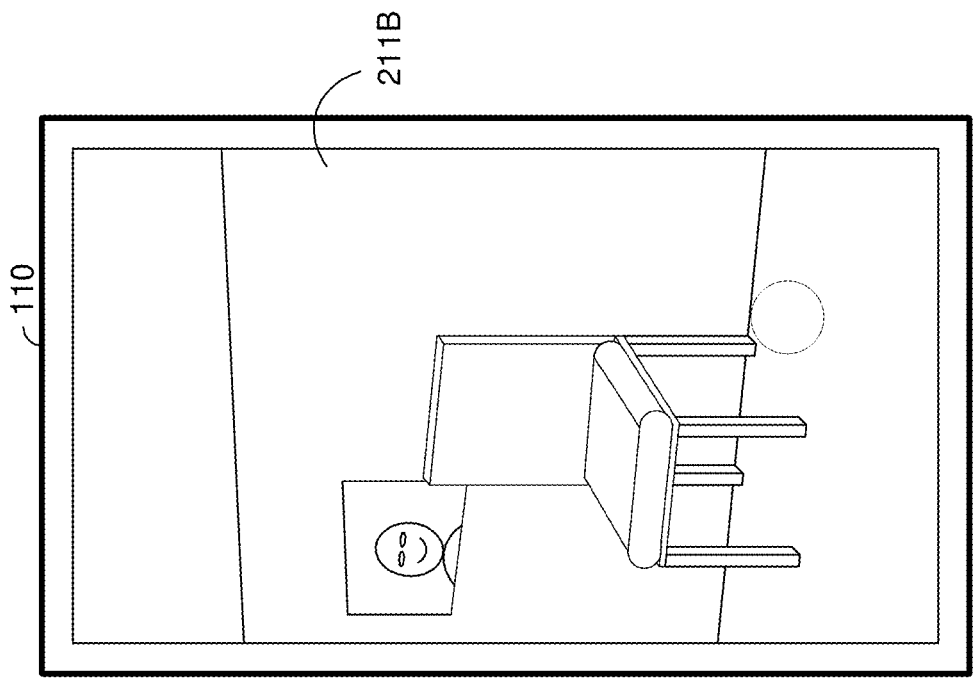
FIGS. 2A and 2B illustrate the handheld electronic device of FIG. 1 displaying two images of the physical environment during the first time period captured from different perspectives.
Figure 2A:
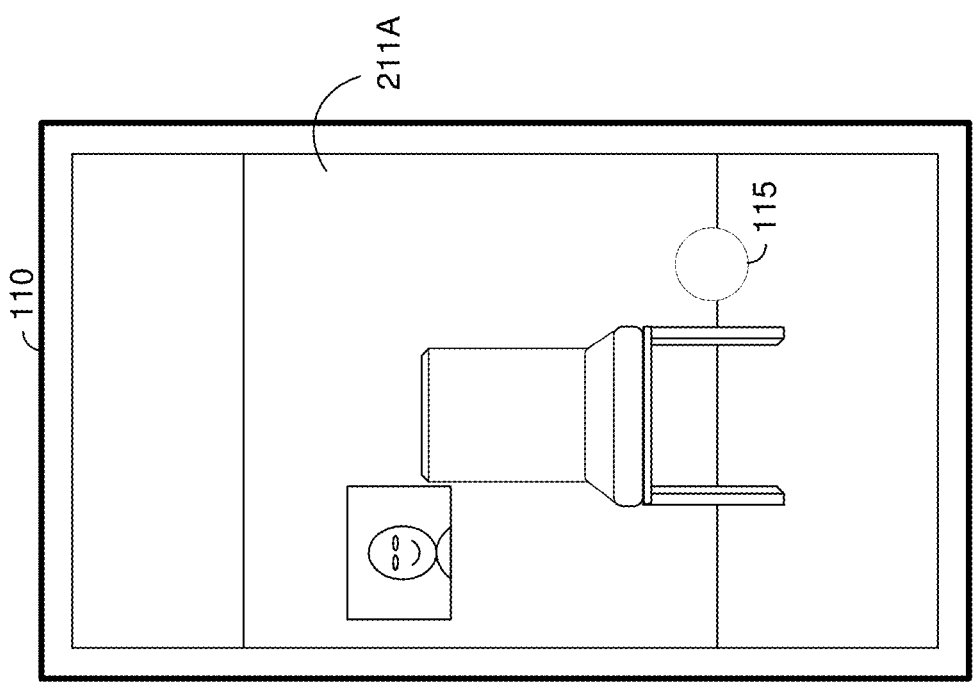

FIG. 2A illustrates the handheld electronic device 110 displaying a first image 211A of the physical environment 101 during the first time period captured from a first perspective. FIG. 2B illustrates the handheld electronic device 110 displaying a second image 211B of the physical environment 101 during the first time period captured from a second perspective different from the first perspective. In FIG. 2A and FIG. 2B, the first image 211A of the physical environment 101 and the second image 211B of the physical environment include a representation of the ball 115 corresponding to the ball 105 in the physical environment 101.

In various implementations, the first image 211A and the second image 211B are captured by the same camera at different times within the first time period (e.g., by the same single scene camera at two different times when the handheld electronic device 110 is moved between the two different times). In various implementations, the first image 211A and the second image 211B are captured by different cameras at the same time (e.g., by two scene cameras) within the first time period.

Using a plurality of images of the physical environment 101 during the first time period captured from a plurality of different perspectives, such as the first image 211A and the second image 211B, the handheld electronic device 110 generates a first point cloud of the physical environment 101.

Figure 3B:
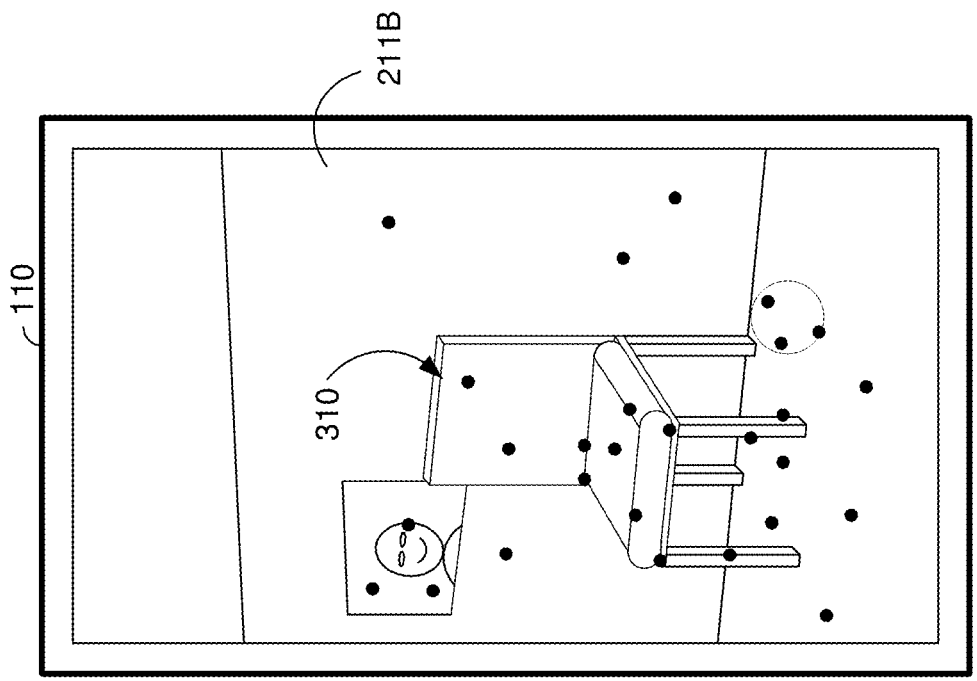
FIGS. 3A and 3B illustrate the handheld electronic device of FIG. 1 displaying the two images overlaid with a representation of a first point cloud.
Figure 3A:
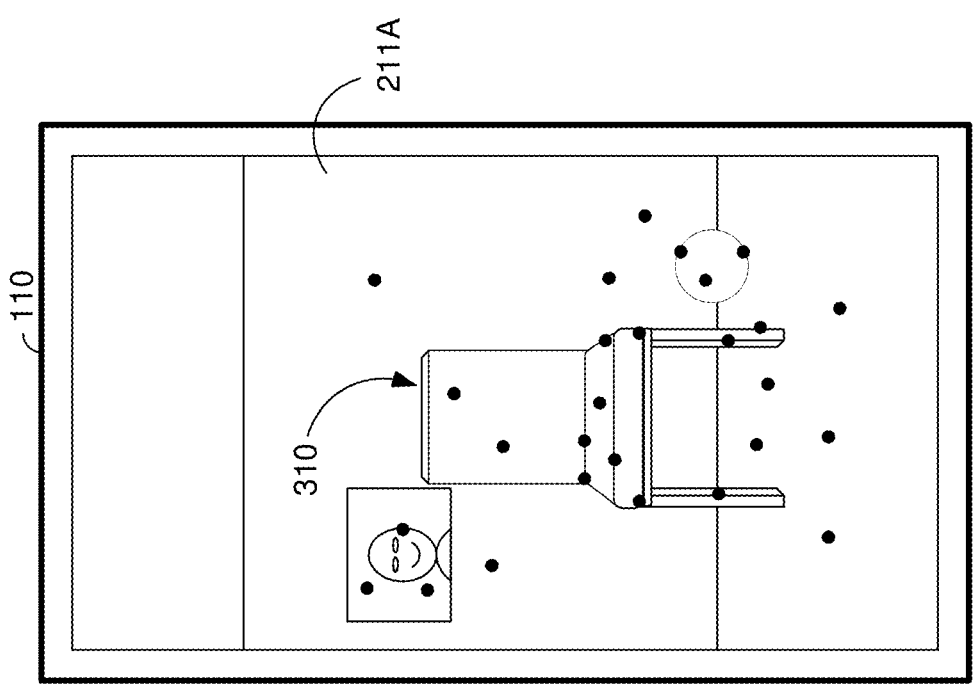

FIG. 3A illustrates the handheld electronic device 110 displaying the first image 211A overlaid with a representation of the first point cloud 310. FIG. 3B illustrates the handheld electronic device 110 displaying the second image 211B overlaid with the representation of the first point cloud 310.

The first point cloud includes a plurality of points, wherein each of the plurality of points is associated with a set of coordinates in a three-dimensional space. For example, in various implementations, each point is associated with an x-coordinate, a y-coordinate, and a z-coordinate. In various implementations, each point in the first point cloud corresponds to a feature in the physical environment 101, such as a surface of an object in the physical environment 101.

The handheld electronic device 110 spatially disambiguates the first point cloud into a plurality of first clusters. Accordingly, each of the clusters includes a subset of the points of the first point cloud.

Figure 4B:
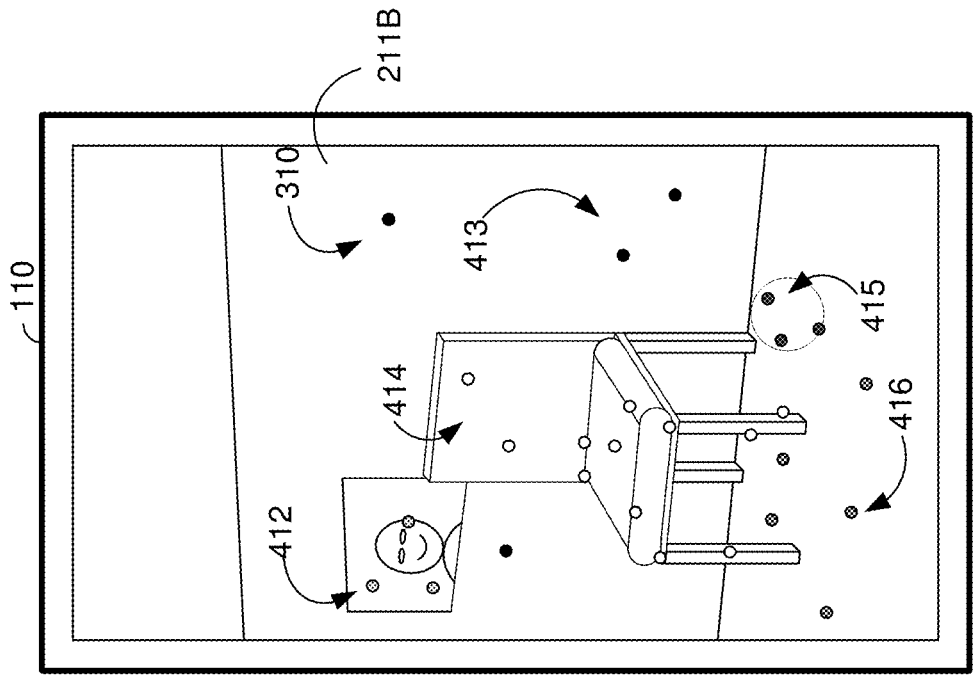
FIGS. 4A and 4B illustrate the handheld electronic device of FIG. 1 displaying the two images overlaid with a representation of the first point cloud spatially disambiguated into a plurality of first clusters.
Figure 4A:
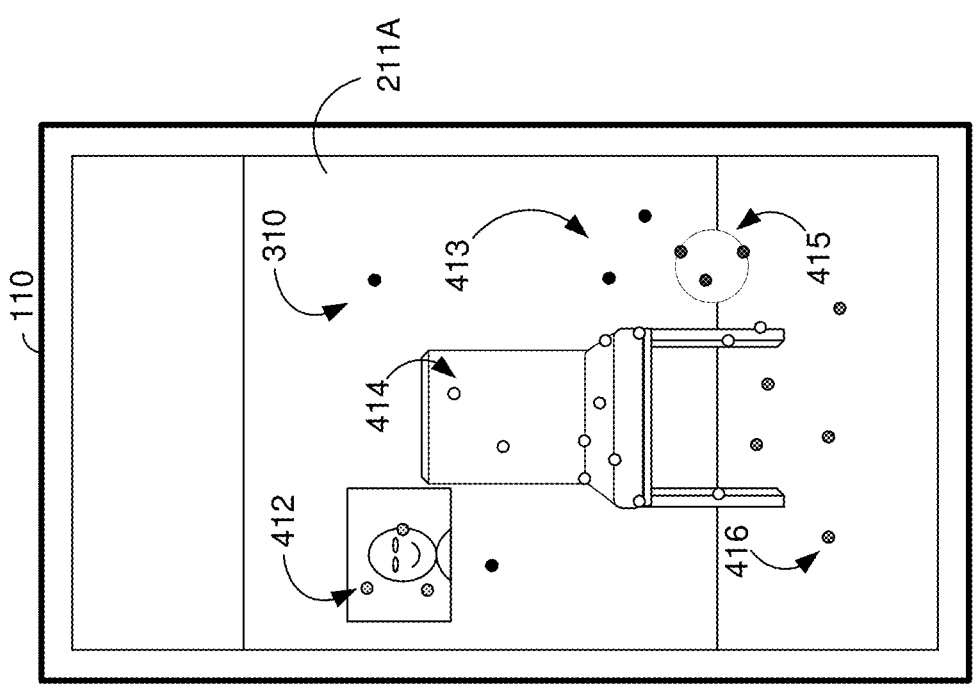

FIG. 4A illustrates the handheld electronic device 110 displaying the first image 211A overlaid with the representation of the first point cloud 310 spatially disambiguated into a plurality of first clusters 412-416. FIG. 4B illustrates the handheld electronic device 110 displaying the second image 211B overlaid with the representation of the first point cloud 310 spatially disambiguated into the plurality of first clusters 412-416. The representation of the first point cloud 310 includes a first cluster 412 (shown in light gray), a second cluster 413 (shown in black), a third cluster 414 (shown in white), a fourth cluster 415 (shown in dark gray), and a fifth cluster 416 (shown in medium gray).

In various implementations, each of the plurality of first clusters is assigned a unique cluster identifier. For example, the clusters may be assigned numbers, letters, or other unique labels.

In various implementations, for each first cluster, the handheld electronic device 110 determines a semantic label. In various implementations, each first cluster corresponds to an object in the physical environment. For example, in FIG. 4A and FIG. 4B, the first cluster 412 corresponds to the picture 102, the second cluster 413 corresponds to the wall 103, the third cluster 414 corresponds to the chair 104, the fourth cluster 415 corresponds to the ball 105, and the fifth cluster 416 corresponds to the floor 106. In various implementations, the semantic label indicates an object type or identity of the object. In various implementations, the handheld electronic device 110 stores the semantic label in association with each point of the first cluster.

Figure 5:
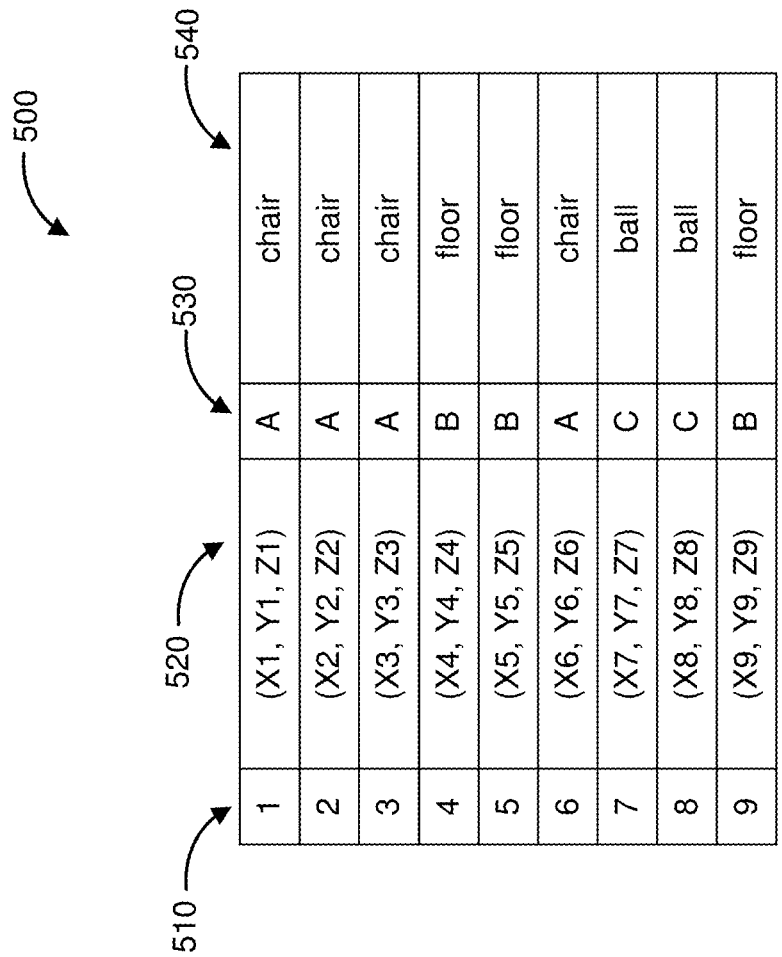
FIG. 5 illustrates a point cloud data object in accordance with some implementations.

FIG. 5 illustrates a point cloud data object 500 in accordance with some implementations. The point cloud data object 500 includes a plurality of data elements (shown as rows in FIG. 5), wherein each data element is associated with a particular point of a point cloud. The data element for a particular point includes a point identifier field 510 that includes a point identifier of a particular point. As an example, the point identifier may be a unique number. The data element for the particular point includes a coordinate field 520 that includes a set of coordinates in a three-dimensional space of the particular point. The data element for the particular point includes a cluster identifier field 530 that includes an identifier of the cluster into which the particular point is spatially disambiguated. As an example, the cluster identifier may be a letter or number. The data element for the particular point includes a semantic label field 540 that includes a semantic label for the cluster into which the particular point is spatially disambiguated.

The semantic labels may be stored in association with the point cloud in other ways. For example, the point cloud may be stored as a set of cluster objects, each cluster object including a cluster identifier for a particular cluster, a semantic label of the particular cluster, and a plurality of sets of coordinates corresponding to the plurality of points spatially disambiguated into the particular cluster.

The handheld electronic device 110 can use the semantic labels in a variety of ways. For example, in various implementations, the handheld electronic device 110 can display a virtual object, such as a virtual ball, on the top of a cluster labeled as a "table", but not on the top of a cluster labeled as a "floor". In various implementations, the handheld electronic device 110 can display a virtual object, such as a virtual painting, over a cluster labeled as a "picture", but not over a cluster labeled as a "television".

During the second time period subsequent to the first time period, in the physical environment 101, the ball 105 is moved from the floor 106 to the seat of the chair 104. In response, the chair 105 (e.g., a cushion on the seat) is deformed by the weight of the ball 105.

Figure 6A:
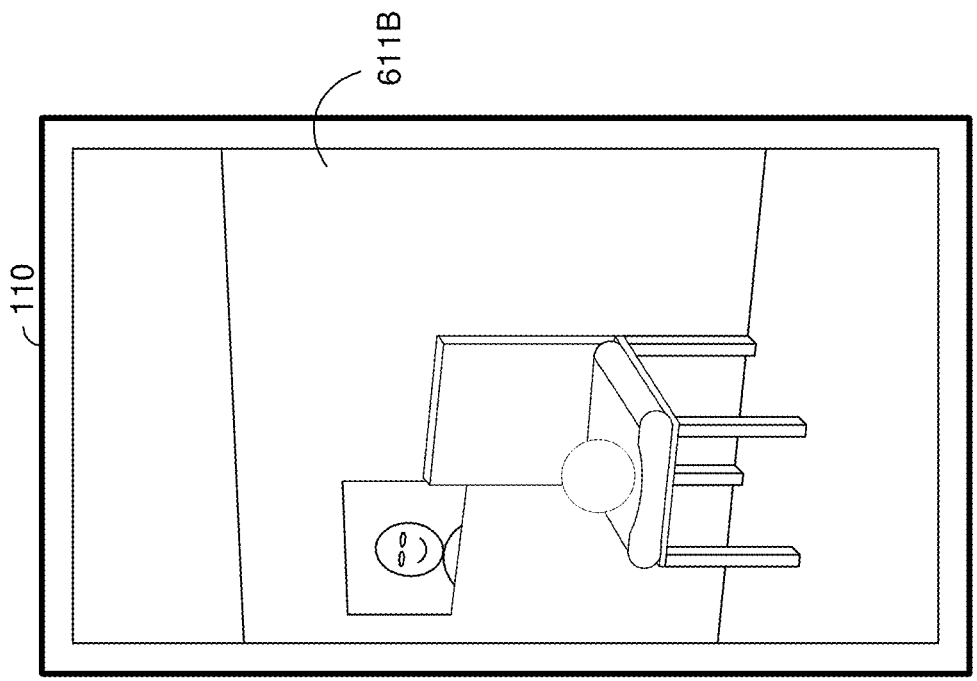
FIGS. 6A and 6B illustrate the handheld electronic device of FIG. 1 displaying two images of the physical environment during a second time period captured from different perspectives.
Figure 6B:
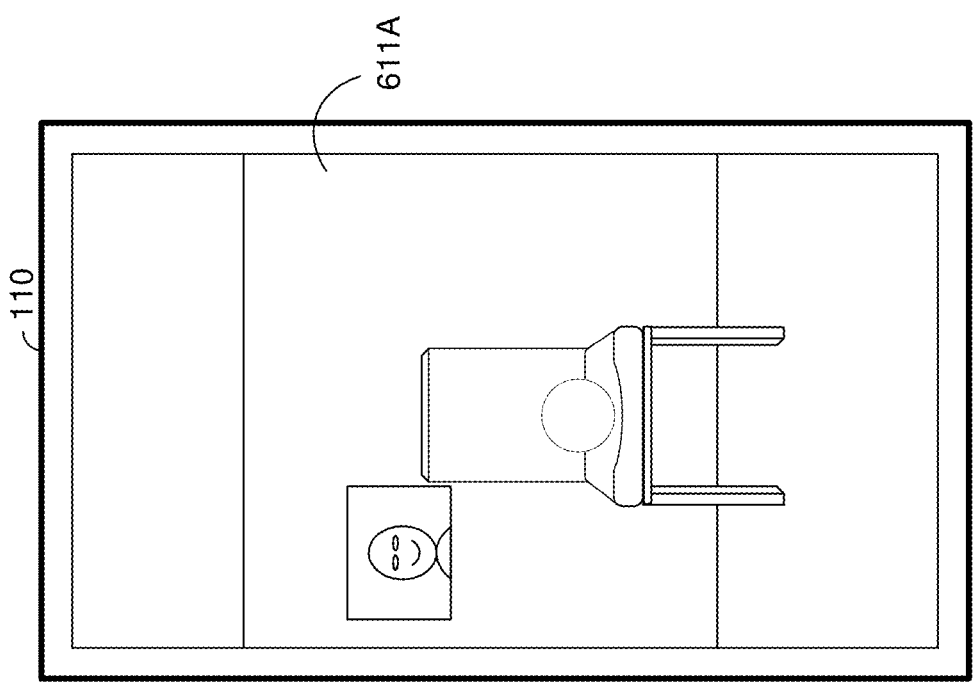

FIG. 6A illustrates the handheld electronic device 110 displaying a third image 611A of the physical environment 101 during the second time period captured from the first perspective. FIG. 6B illustrates the handheld electronic device 110 displaying a fourth image 611B of the physical environment 101 during the second time period captured from the second perspective.

In various implementations, the third image 611A and the fourth image 611B are captured by the same camera at different times within the second time period (e.g., by the same single scene camera at two different times when the handheld electronic device 110 is moved between the two different times). In various implementations, the third image 611A and the fourth image 611B are captured by different cameras at the same time (e.g., by two scene cameras) within the second time period.

Using a plurality of images of the physical environment 101 during the second time period captured from a plurality of different perspectives, such as the third image 611A and the fourth image 611B, the handheld electronic device 110 generates a second point cloud of the physical environment 101. In various implementations, the handheld electronic device 110 generates the second point cloud as a new point cloud of the physical environment 101 independent of the first point cloud. In various implementations, the handheld electronic device 110 generates the second point cloud by adding points to and/or removing points from the first point cloud.

The handheld electronic device 110 spatially disambiguates the second point cloud into a plurality of second clusters. In various implementations, each of the plurality of second clusters is assigned a unique cluster identifier. However, in various implementations, the assigned cluster identifiers may be the same as those previously assigned to one or more of the plurality of first clusters. Similarly, in various implementations, particular points of the second point cloud are determined to correspond to particular points of the first point cloud. In various implementations, the points of the first point cloud and the second point cloud are tracked or feature-matched to determine that they are the same point.

Figure 7B:
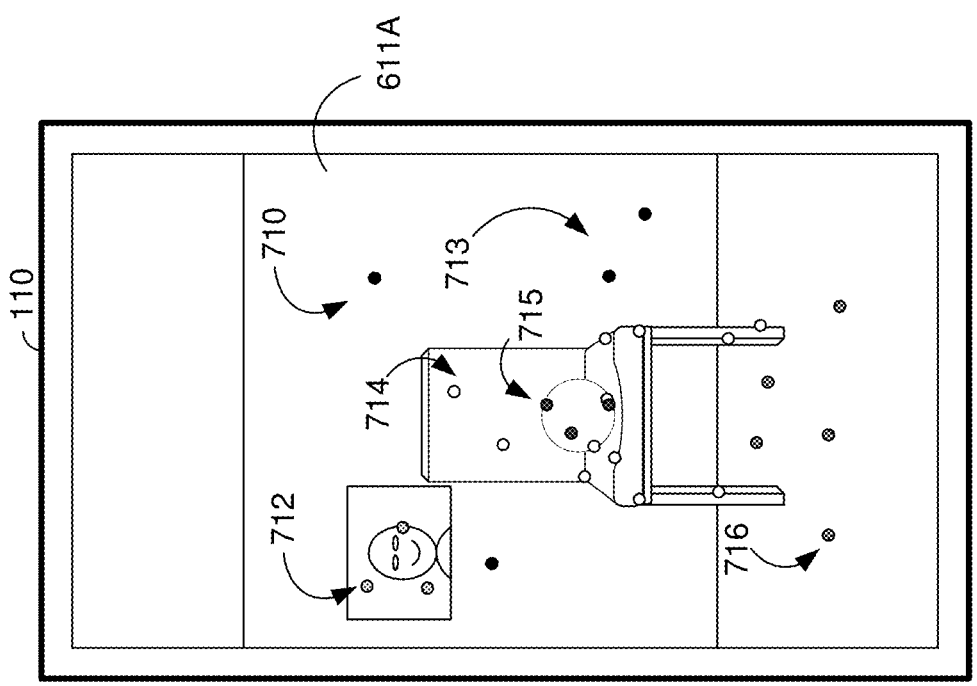
FIGS. 7A and 7B illustrate the handheld electronic device of FIG. 1 displaying the two images overlaid with the representation of a second point cloud spatially disambiguated into a plurality of second clusters.
Figure 7A:
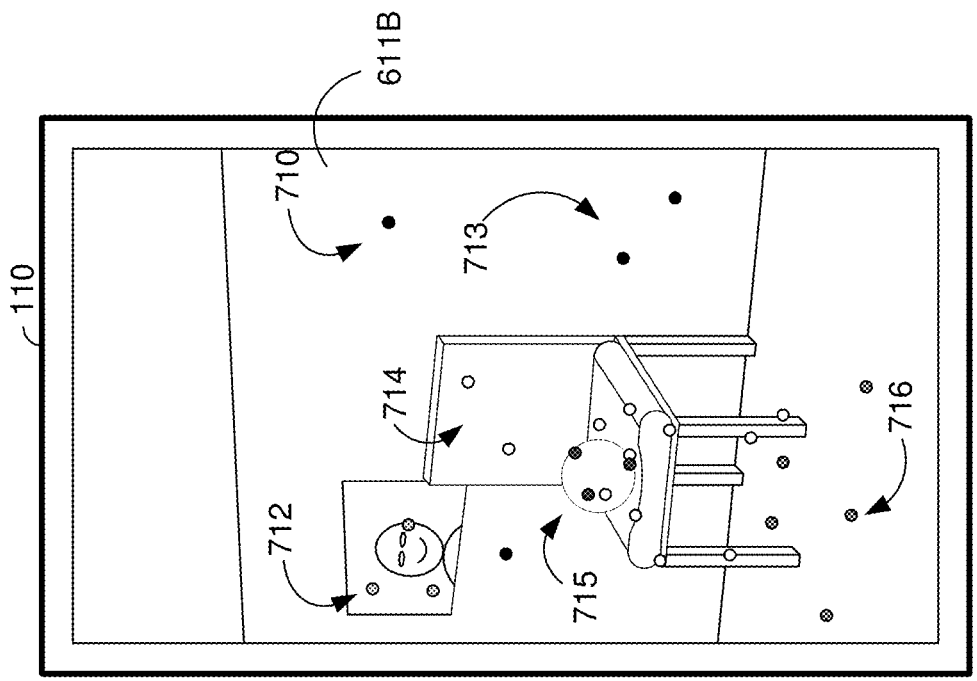

FIG. 7A illustrates the handheld electronic device 110 displaying the third image 611A overlaid with the representation of the second point cloud 710 spatially disambiguated into a plurality of second clusters 712-716. FIG. 7B illustrates the handheld electronic device 110 displaying the fourth image 611B overlaid with the representation of the second point cloud 710 spatially disambiguated into the plurality of second clusters 712-716. The representation of the second point cloud 710 includes a first cluster 712 (shown in light gray), a second cluster 713 (shown in black), a third cluster 714 (shown in white), a fourth cluster 715 (shown in dark gray), and a fifth cluster 716 (shown in medium gray).

FIG. 8 illustrates a temporally variable point cloud data object 800 in accordance with some implementations. The temporally variable point cloud data object 800 includes a plurality of data elements (shown as rows in FIG. 8), wherein each data element is associated with a particular point of a point cloud. The data element for a particular point includes a point identifier field 510 that includes a point identifier of a particular point. As an example, the point identifier may be a unique number. The data element for the particular point includes a coordinate field 820 that includes a plurality of sets of coordinates in a three-dimensional space of the particular point at a respective plurality of times. The data element for the particular point includes a cluster identifier field 530 that includes an identifier of the cluster into which the particular point is spatially disambiguated. As an example, the cluster identifier may be a letter or number. The data element for the particular point includes a semantic label field 540 that includes a semantic label for the cluster into which the particular point is spatially disambiguated.

The handheld electronic device 110 generates an object model based on the plurality of points associated with a particular cluster identifier. The object model includes a plurality of vertices corresponding to the plurality of points and a plurality of edges between respective pairs of the plurality of vertices.

Figure 9A:
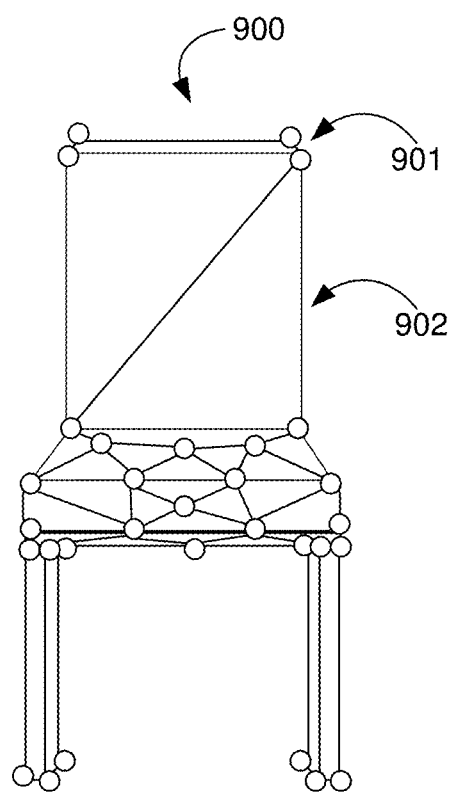
FIG. 9A illustrates an object model of a chair in accordance with various implementations.

FIG. 9A illustrates an object model 900 of a chair in accordance with various implementations. In various implementations, the object model 900 is a mesh-based object model. The object model 900 includes a plurality of vertices 901 and a plurality of edges 902 between respective pairs of the plurality of vertices. In various implementations, the object model 900 further include one or more faces surrounded by edges, one or more textures associated with the faces, and/or a semantic label, object/cluster identifier, physics data or other information associated with the object model.

FIG. 9B illustrates an object model data object 950 in accordance with various implementations. The object model data object 950 includes a plurality of data elements (shown as rows in FIG. 9B), wherein each data element is associated with a particular vertex of the object model. The data element for a particular vertex includes a vertex identifier field 910 that includes a vertex identifier of a particular vertex. As an example, the vertex identifier may be a unique number. The data element for the particular vertex includes a coordinate field 920 that includes a set of coordinates in a three-dimensional space of the particular vertex. In various implementations, the set of coordinates is the same as one of the plurality of sets of coordinates of the corresponding point in the temporally variable point cloud data object 800, e.g., the set of coordinates of the point when the object is in an undeformed state.

The data element for the particular vertex includes an edge descriptor field 930 that defines one or more edges connecting the particular vertex to one or more other vertices. In various implementations, the edge descriptor field includes a list of the one or more other vertices with which the particular vertex shares an edge.

The data element for the particular point includes a joint data vector field 940 that includes a joint data vector defining joint data for the particular vertex. In various implementations, the joint data vector includes a joint label that characterizes how the vertex moves with respect to one or more other vertices with which the particular vertex shares an edge. For example, the joint label may describe a pivot joint, a hinge joint, or a tension joint. In various implementations, the joint data vector includes joint data with respect to the one or more edges of the particular vertex, such as a spring coefficient of the joint with respect to the one or more edges of the particular vertex.

Figure 9C:
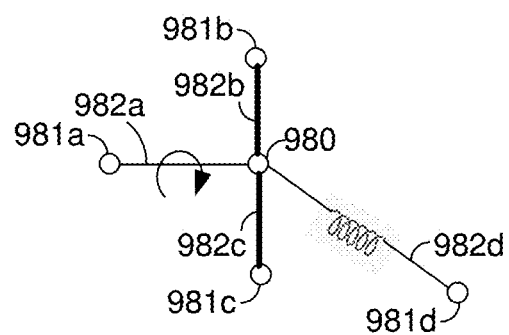
FIG. 9C illustrates a vertex sharing a plurality of edges with a respective plurality of other vertices in accordance with various implementations.

In various implementations, the joint data vector includes multiple joint labels that characterize how the vertex moves with respect to different sets of one or more other vertices with which the particular vertex shares an edge. FIG. 9C illustrates a vertex 980 sharing a plurality of edges 982a-982d with a respective plurality of other vertices 981a-981d. The vertex 980 shares a first edge 982a with a first other vertex 981a. In various implementations, the joint data vector for the vertex 980 includes a first joint label indicating a pivot joint. Thus, in response to virtual forces applied to a model including the vertex 980, portions of the model coupled to the first other vertex 981a rotate about the first edge 982a. In various implementations, the joint data vector for the vertex 980 includes first joint data indicating a spring coefficient for the vertex 980 with respect to the first edge 982a indicating an amount of movement caused by a particular amount of virtual force.

The vertex 980 shares a second edge 982b with a second other vertex 981b and a third edge 982c with a third other vertex 981c. In various implementations, the joint data vector for the vertex 980 includes a second joint label indicating a hinge joint. Thus, in response to virtual forces applied to a model including the vertex 980, portions of the model coupled to the second other vertex 981b and/or portions of the model coupled to the third other vertex 981c move in a plane defined by the second edge 982b and the third edge 982c rotating about the vertex 980 as though the second edge 982b and the third edge 982c were the arms of a hinge and the vertex 980 were the pivot of the hinge. In various implementations, the joint data vector for the vertex 980 includes second joint data indicating the edges forming the arms of the hinge. In various implementations, the joint data vector for the vertex 980 includes second joint data indicating a spring coefficient for the vertex 980 with respect to the edges forming the arms of the hinge indicating an amount of movement caused by a particular amount of virtual force.

The vertex 980 shares a fourth edge 982d with a fourth other vertex 981d. In various implementations, the joint data vector for the vertex 980 includes a third joint label indicating a tension joint. Thus, in response to virtual forces applied to a model including the vertex 980, portions of the model coupled to the fourth other vertex 981d move towards or away from the vertex 980 along a line defined by the fourth edge 982d. In various implementations, the joint data vector for the vertex 980 includes third joint data indicating a spring coefficient for the vertex 980 with respect to the fourth edge 982d indicating an amount of movement caused by a particular amount of virtual force.

In various implementations, the joint data vector for the vertex 980 includes joint data indicating a spring coefficient for the vertex 980 with respect to a set of one or more edges indicating an amount of movement caused by a particular amount of virtual force. In various implementations, the amount of movement caused by a particular amount of virtual force is linearly proportional to the amount of virtual force and the spring coefficient. In various implementations, the joint data vector for the vertex 980 includes joint data indicating a friction coefficient for the vertex 980 with respect to a set of one or more edges indicating a speed of movement caused by a particular amount of virtual force. In various implementations, the speed of movement caused by a particular amount of virtual force is linearly proportional to the amount of virtual force and the friction coefficient.

Figure 10:
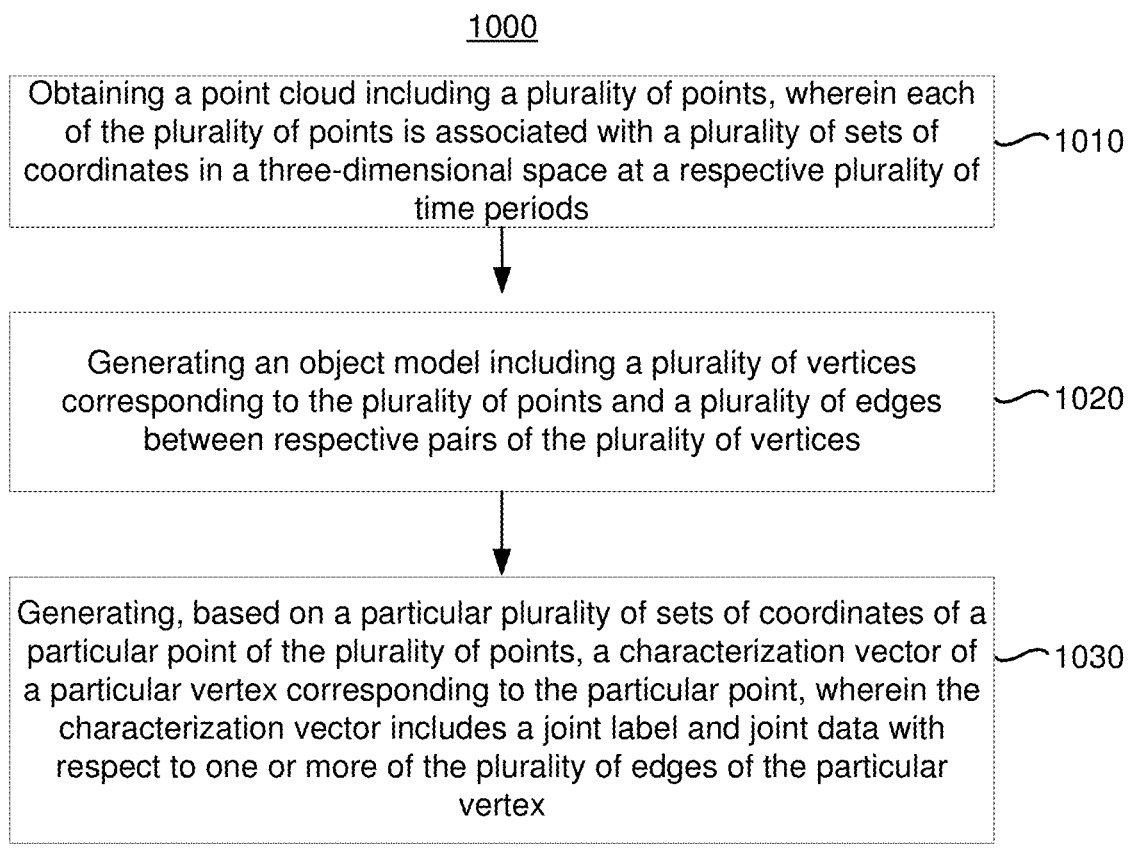
FIG. 10 is a flowchart representation of a method of generating an object model in accordance with some implementations.

FIG. 10 is a flowchart representation of a method 1000 of generating an object model in accordance with some implementations. In various implementations, the method 1000 is performed by a device with one or more processors and non-transitory memory. In some implementations, the method 1000 is performed by processing logic, including hardware, firmware, software, or a combination thereof. In some implementations, the method 1000 is performed by a processor executing instructions (e.g., code) stored in a non-transitory computer-readable medium (e.g., a memory).

The method 1000 begins, in block 1010, with the device obtaining a point cloud including a plurality of points, wherein each of the plurality of points is associated with a plurality of sets of coordinates in a three-dimensional space at a respective plurality of time periods. In various implementations, the time periods are an instant, a fraction of a second, a few seconds, a few hours, a few days, or any length of time.

For example, FIG. 8 illustrates the temporally variable point cloud data object 800 including a plurality of points identified by the point identifier in the point identifier field 510, wherein each of the plurality of points is associated with a plurality of sets of coordinates in the coordinate field 820.

In various implementations, obtaining the point cloud includes obtaining a first point cloud including a plurality of points, wherein each of the plurality of points is associated with a first set of coordinates in the three-dimensional space at a first time period. For example, FIG. 4A illustrates a representation of a first point cloud 310. In various implementations, obtaining the point cloud includes obtaining a second point cloud including a plurality of points, wherein each of the plurality of points is associated with a second set of coordinates in the three-dimensional space at a second time period. For example, FIG. 7A illustrates a representation of a second point cloud 710. In various implementations, obtaining the point cloud includes determining a correspondence between respective points of the first point cloud and the second point cloud and generating the point cloud based on the correspondence. For example, in FIG. 8, the temporally variable point cloud data object 800 includes points with multiple sets of coordinates in the three-dimensional space based on a correspondence between respective points of the first point cloud and the second point cloud.

In various implementations, obtaining the first point cloud includes obtaining a first plurality of images of a physical environment during the first time period from a plurality of different perspectives and generating the first point cloud based on the plurality of images of the physical environment during the first time period. For example, in various implementations, the device detects the same feature in two or more images of the physical environment during the first time period and using perspective transform geometry, determines the sets of coordinates in the three-dimensional space of the feature. In various implementations, the plurality of images of the physical environment during the first time period is captured by the same camera at different times during the first time period (e.g., by the same single scene camera of the device at different times when the device is moved between the times). In various implementations, the plurality of images is captured by different cameras at the same time during the first time period (e.g., by multiple scene cameras of the device).

In various implementations, obtaining the first point cloud includes obtaining an image of a physical environment during the first time period, obtaining a depth map of the image of the physical environment, and generating the first point cloud based on the image of the physical environment during the first time period and the depth map of the image of the physical environment. In various implementations, the image is captured by a scene camera of the device and the depth map of the image of the physical environment is generated by a depth sensor of the device.

In various implementations, obtaining the first point cloud includes using a 3D scanner to generate the first point cloud.

In various implementations, each point in the first point cloud is associated with additional data. In various implementations, each point in the first point cloud is associated with a color. As an example, such information may be useful in determining the correspondence between respective points of the first point cloud and the second point cloud. In various implementations, each point in the first point cloud is associated with a color-variation indicating how the point changes color over time. As an example, such information may be useful in discriminating between a semantic label of a "picture" or a "television". In various implementations, each point in the first point cloud is associated with a confidence indicating a probability that the set of coordinates in the three-dimensional space of the point is the true location of the corresponding surface of the object in the physical environment.

In various implementations, obtaining the first point cloud includes spatially disambiguating portions of the plurality of points into a plurality of first clusters. Each first cluster includes a subset of the plurality of points of the first point cloud and is assigned a unique cluster identifier. In various implementations, particular points of the plurality of points (e.g., those designated as noise) are not included in any of the plurality of first clusters.

Various point cloud clustering algorithms can be used to spatially disambiguate the first point cloud. In various implementations, spatially disambiguating portions of the plurality of points into the plurality of first clusters includes performing plane model segmentation. Accordingly, certain clusters of the plurality of first clusters correspond to sets of points of the first point cloud that lie in the same plane. In various implementations, spatially disambiguating portions of the plurality of points into the plurality of first clusters includes performing Euclidean cluster extraction.

In various implementations, obtaining the second point cloud is performed in substantially the same way as obtaining the first point cloud. In various implementations, obtaining the first point cloud and obtaining the second point cloud includes obtaining video data at the first time period and the second time period.

In various implementations, obtaining the second point cloud is based on the first point cloud, with newly detected points added to the first point cloud, redetected points maintained in the first point cloud, and undetected points removed from the first point cloud. In various implementations, the threshold level of confidence for a newly detected point to be added to the first point cloud is greater than the threshold level of confidence for a redetected point to be maintained in the first point cloud.

In various implementations, obtaining the second point cloud includes inferring feature locations based on external forces. For example, in FIG. 7A, the set of coordinates for a point of the second point cloud corresponding to the seat of the chair 104 beneath the ball 105 can be determined based on the shape (and presumed rigidity) of the ball 105.

In various implementations, determining the correspondence between the respective points of the first point cloud and the second point cloud includes at least one of point tracking and/or feature matching. For example, in various implementations, a particular point in the first point cloud and a particular point in the second point cloud are determined to correspond if the point has moved less than a threshold distance between the first time period and the second time period. In various implementations, a particular point in the first point cloud and a particular point in the second point cloud are determined to correspond if the feature of the object represented by the particular points is the same.

In various implementations, generating the characterization vector includes determining a change in force between the first time period and the second time period and generating the joint data based on the change in force. For example, as between FIG. 4A and FIG. 7A, the electronic device determines a change in force applied to the seat of the chair 104. In particular, the electronic device determines a force equal to the weight of the ball (which may be known in advance) is applied to the seat of the chair 104 during the second time period that was not applied during the first time period. In response, the electronic device determines the joint data for various vertices of the object model based on this applied force.

In various implementations, the joint label indicates a pivot joint with respect to a particular edge of the plurality of edges of the particular vertex indicating that portions of the object model connected to the particular edge rotate about the particular edge.

In various implementations, the joint label indicates a hinge joint with respect to a first edge of the plurality of edges of the particular vertex and a second edge of the plurality of edges of the particular vertex indicating that portions of the object model coupled to the first edge and/or portions of the object model coupled to the second edge rotate about the particular vertex in a plane defined by the first edge and the second edge.

In various implementations, the joint label indicates a tension joint with respect to a particular edge of the plurality of edges of the particular vertex indicating the portions of the object model connected to the particular edge move in a line defined by the particular edge.

In various implementations, the joint data indicates a spring coefficient indicating an amount of movement caused by a particular amount of virtual force. In various implementations, the amount of movement caused by the particular amount of virtual force is linearly proportional to the particular amount of virtual force and the spring coefficient. In various implementations, the joint data indicates a friction coefficient indicating a speed of movement caused by a particular amount of virtual force.

In various implementations, the method 1000 is performed as video is captured of an object and an approximately known force is applied to various portions of the object. For example, in various implementations, video is captured as a weight is moved to rest upon various locations of the object or as a user pushes their hand against various portions of the object.

Figure 11:
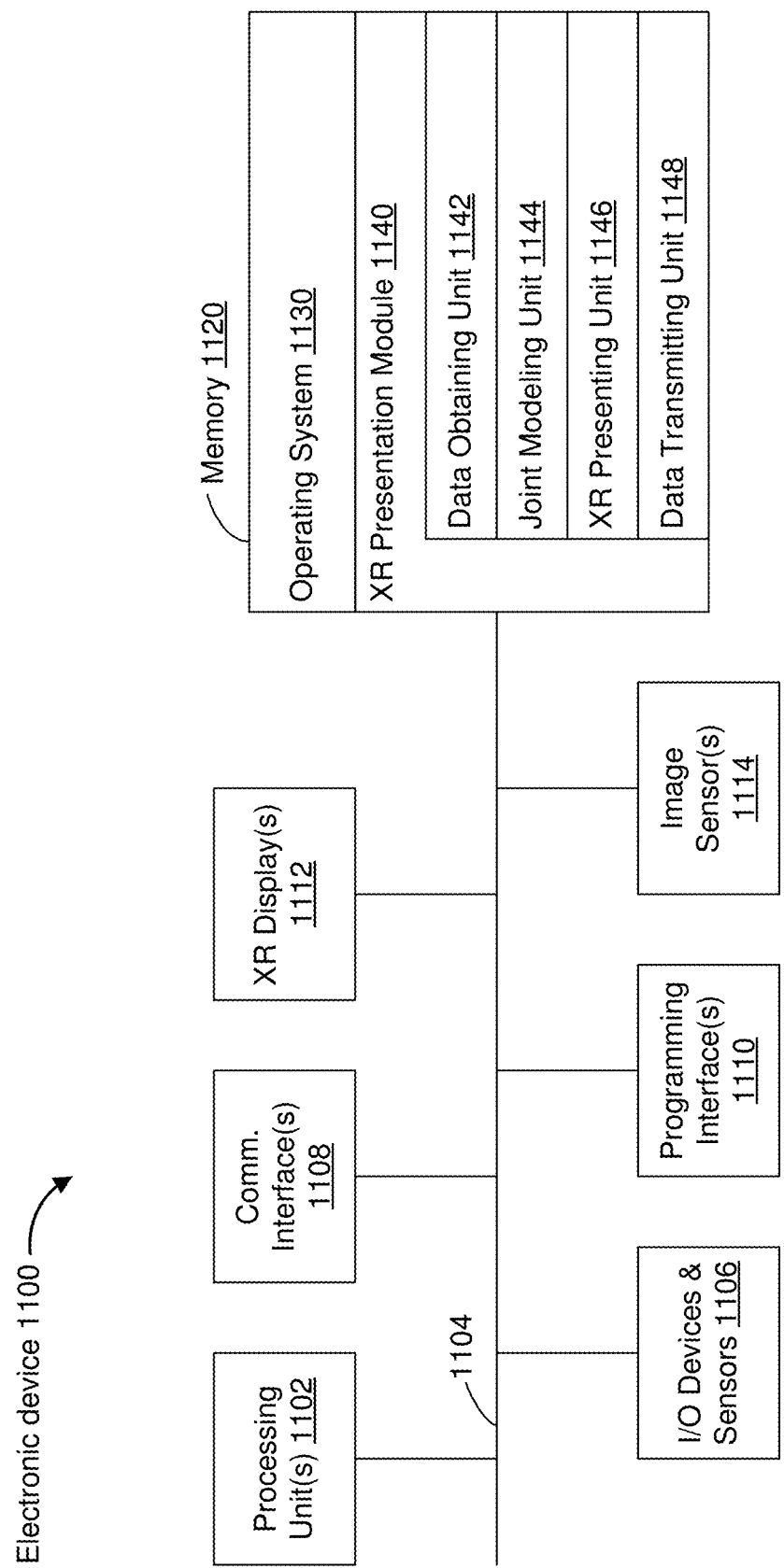
FIG. 11 is a block diagram of an electronic device in accordance with some implementations.

FIG. 11 is a block diagram of an electronic device 1100 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 1100 includes one or more processing units 1102 (e.g., microprocessors, ASICs, FPGAs, GPUs, CPUs, processing cores, and/or the like), one or more input/output (I/O) devices and sensors 1106, one or more communication interfaces 1108 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 1110, one or more XR displays 1112, one or more optional interior- and/or exterior-facing image sensors 1114, a memory 1120, and one or more communication buses 1104 for interconnecting these and various other components.

In some implementations, the one or more communication buses 1104 include circuitry that interconnects and controls communications between system components. In some implementations, the one or more I/O devices and sensors 1106 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 1112 are configured to present XR content to the user. In some implementations, the one or more XR displays 1112 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 1112 correspond to diffractive, reflective, polarized, holographic, etc. waveguide displays. For example, the electronic device 1100 includes a single XR display. In another example, the electronic device 1100 includes an XR display for each eye of the user. In some implementations, the one or more XR displays 1112 are capable of presenting AR, MR, and/or VR content.

In various implementations, the one or more XR displays 1112 are video passthrough displays which display at least a portion of a physical environment as an image captured by a scene camera. In various implementations, the one or more XR displays 1112 are optical see-through displays which are at least partially transparent and pass light emitted by or reflected off the physical environment.

In some implementations, the one or more image sensors 1114 are configured to obtain image data that corresponds to at least a portion of the face of the user that includes the eyes of the user (any may be referred to as an eye-tracking camera). In some implementations, the one or more image sensors 1114 are configured to be forward-facing so as to obtain image data that corresponds to the physical environment as would be viewed by the user if the electronic device 1100 was not present (and may be referred to as a scene camera). The one or more optional image sensors 1114 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 1120 includes high-speed random-access memory, such as DRAM, SRAM, DDR RAM, or other random-access solid-state memory devices. In some implementations, the memory 1120 includes non-volatile memory, such as one or more magnetic disk storage devices, optical disk storage devices, flash memory devices, or other non-volatile solid-state storage devices. The memory 1120 optionally includes one or more storage devices remotely located from the one or more processing units 1102. The memory 1120 comprises a non-transitory computer readable storage medium. In some implementations, the memory 1120 or the non-transitory computer readable storage medium of the memory 1120 stores the following programs, modules and data structures, or a subset thereof including an optional operating system 1130 and an XR presentation module 1140.

The operating system 1130 includes procedures for handling various basic system services and for performing hardware dependent tasks. In some implementations, the XR presentation module 1140 is configured to present XR content to the user via the one or more XR displays 1112. To that end, in various implementations, the XR presentation module 1140 includes a data obtaining unit 1142, a joint modeling unit 1144, an XR presenting unit 1146, and a data transmitting unit 1148.

In some implementations, the data obtaining unit 1142 is configured to obtain data (e.g., presentation data, interaction data, sensor data, location data, etc.). The data may be obtained from the one or more processing units 1102 or another electronic device. For example, in various implementations, the data obtaining unit 1142 obtains a temporally variable point cloud. To that end, in various implementations, the data obtaining unit 1142 includes instructions and/or logic therefor, and heuristics and metadata therefor.

In some implementations, the joint modeling unit 1144 is configured to generate a characterization vector for at least one vertex of an object model, wherein the characterization vector includes a joint label and joint data with respect to one or more edges of the vertex. To that end, in various implementations, the joint modeling unit 1144 includes instructions and/or logic therefor, and heuristics and metadata therefor.

In some implementations, the XR presenting unit 1146 is configured to present XR content via the one or more XR displays 1112. To that end, in various implementations, the XR presenting unit 1146 includes instructions and/or logic therefor, and heuristics and metadata therefor.

In some implementations, the data transmitting unit 1148 is configured to transmit data (e.g., presentation data, location data, etc.) to the one or more processing units 1102, the memory 1120, or another electronic device. To that end, in various implementations, the data transmitting unit 1148 includes instructions and/or logic therefor, and heuristics and metadata therefor.

Although the data obtaining unit 1142, the joint modeling unit 1144, the XR presenting unit 1146, and the data transmitting unit 1148 are shown as residing on a single electronic device 1100, it should be understood that in other implementations, any combination of the data obtaining unit 1142, the joint modeling unit 1144, the XR presenting unit 1146, and the data transmitting unit 1148 may be located in separate computing devices.

Moreover, FIG. 11 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 11 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at an electronic device including a processor and non-transitory memory:
obtaining a point cloud including a plurality of points, wherein each of the plurality of points is associated with a plurality of sets of coordinates in a three-dimensional space at a respective plurality of time periods;
generating an object model including a plurality of vertices corresponding to the plurality of points and a plurality of edges between respective pairs of the plurality of vertices; and
based on a particular plurality of sets of coordinates of a particular point of the plurality of points, generating a characterization vector of a particular vertex corresponding to the particular point, wherein the characterization vector includes a joint label and joint data with respect to one or more of the plurality of edges of the particular vertex.

2. The method of claim 1, wherein obtaining the point cloud includes:
obtaining a first point cloud including a plurality of points, wherein each of the plurality of points is associated with a first set of coordinates in the three-dimensional space at a first time period;
obtaining a second point cloud including a plurality of points, wherein each of the plurality of points is associated with a second set of coordinates in the three-dimensional space at a second time period;
determining a correspondence between respective points of the first point cloud and the second point cloud; and
generating the point cloud based on the correspondence.

3. The method of claim 2, wherein determining the correspondence between the respective points of the first point cloud and the second point cloud includes at least one of point tracking and/or feature matching.

4. The method of claim 2, wherein obtaining the first point cloud and obtaining the second point cloud includes obtaining video data at the first time period and the second time period.

5. The method of claim 2, wherein generating the characterization vector includes:
determining a change in force between the first time period and the second time period; and
generating the joint data based on the change in force.

6. The method of claim 1, wherein the joint label indicates a pivot joint with respect to a particular edge of the plurality of edges of the particular vertex indicating that portions of the object model connected to the particular edge rotate about the particular edge.

7. The method of claim 1, wherein the joint label indicates a hinge joint with respect to a first edge of the plurality of edges of the particular vertex and a second edge of the plurality of edges of the particular vertex indicating that portions of the object model coupled to the first edge and/or portions of the object model coupled to the second edge rotate about the particular vertex in a plane defined by the first edge and the second edge.

8. The method of claim 1, wherein the joint label indicates a tension joint with respect to a particular edge of the plurality of edges of the particular vertex indicating the portions of the object model connected to the particular edge move in a line defined by the particular edge.

9. The method of claim 1, wherein the joint data indicates a spring coefficient indicating an amount of movement caused by a particular amount of virtual force.

10. The method of claim 9, wherein the amount of movement caused by the particular amount of virtual force is linearly proportional to the particular amount of virtual force and the spring coefficient.

11. The method of claim 1, wherein the joint data indicates a friction coefficient indicating a speed of movement caused by a particular amount of virtual force.

12. A device comprising:
a non-transitory memory; and
one or more processors to:
obtain a point cloud including a plurality of points, wherein each of the plurality of points is associated with a plurality of sets of coordinates in a three-dimensional space at a respective plurality of time periods;
generate an object model including a plurality of vertices corresponding to the plurality of points and a plurality of edges between respective pairs of the plurality of vertices; and
generate, based on a particular plurality of sets of coordinates of a particular point of the plurality of points, a characterization vector of a particular vertex corresponding to the particular point, wherein the characterization vector includes a joint label and joint data with respect to one or more of the plurality of edges of the particular vertex.

13. The device of claim 12, wherein the one or more processors are to obtain the point cloud by:
obtaining a first point cloud including a plurality of points, wherein each of the plurality of points is associated with a first set of coordinates in the three-dimensional space at a first time period;
obtaining a second point cloud including a plurality of points, wherein each of the plurality of points is associated with a second set of coordinates in the three-dimensional space at a second time period;
determining a correspondence between respective points of the first point cloud and the second point cloud; and
generating the point cloud based on the correspondence.

14. The device of claim 13, wherein the one or more processors are to generate the characterization vector by:
determining a change in force between the first time period and the second time period; and
generating the joint data based on the change in force.

15. The device of claim 12, wherein the joint label indicates a pivot joint with respect to a particular edge of the plurality of edges of the particular vertex indicating that portions of the object model connected to the particular edge rotate about the particular edge.

16. The device of claim 12, wherein the joint label indicates a hinge joint with respect to a first edge of the plurality of edges of the particular vertex and a second edge of the plurality of edges of the particular vertex indicating that portions of the object model coupled to the first edge and/or portions of the object model coupled to the second edge rotate about the particular vertex in a plane defined by the first edge and the second edge.

17. The device of claim 12, wherein the joint label indicates a tension joint with respect to a particular edge of the plurality of edges of the particular vertex indicating the portions of the object model connected to the particular edge move in a line defined by the particular edge.

18. The device of claim 12, wherein the joint data indicates a spring coefficient indicating an amount of movement caused by a particular amount of virtual force.

19. The device of claim 12, wherein the joint data indicates a friction coefficient indicating a speed of movement caused by a particular amount of virtual force.

20. A non-transitory memory storing one or more programs, which, when executed by one or more processors of a device, cause the device to:

obtain a point cloud including a plurality of points, wherein each of the plurality of points is associated with a plurality of sets of coordinates in a three-dimensional space at a respective plurality of time periods;

generate an object model including a plurality of vertices corresponding to the plurality of points and a plurality of edges between respective pairs of the plurality of vertices; and generate, based on a particular plurality of sets of coordinates of a particular point of the plurality of points, a characterization vector of a particular vertex corresponding to the particular point, wherein the characterization vector includes a joint label and joint data with respect to one or more of the plurality of edges of the particular vertex.

* * * * *